(12) United States Patent
Brockmann et al.

(10) Patent No.: US 8,770,674 B2
(45) Date of Patent: Jul. 8, 2014

(54) MODULATOR

(75) Inventors: Christoph Brockmann, Hemmingen (DE); Claudia Deike, Pattensen (DE); Matthias Grimm, Hannover (DE); Hartmut Rosendahl, Hannover (DE); Ingo Torhoff, Barsinghausen (DE); Hans-Klaus Wolff, Springe (DE)

(73) Assignee: WABCO GmbH, Hannover (DE)

( * ) Notice: Subject to any disclaimer, the term of this patent is extended or adjusted under 35 U.S.C. 154(b) by 408 days.

(21) Appl. No.: 12/451,036

(22) PCT Filed: Apr. 26, 2008

(86) PCT No.: PCT/EP2008/003396
§ 371 (c)(1),
(2), (4) Date: Feb. 3, 2010

(87) PCT Pub. No.: WO2008/138469
PCT Pub. Date: Nov. 20, 2008

(65) Prior Publication Data
US 2010/0141025 A1  Jun. 10, 2010

(30) Foreign Application Priority Data

May 9, 2007  (DE) .......................... 10 2007 021 646

(51) Int. Cl.
*B60T 8/32* (2006.01)
*B60T 8/36* (2006.01)
*B60G 17/052* (2006.01)

(52) U.S. Cl.
CPC .............. *B60T 8/327* (2013.01); *B60T 8/3605* (2013.01); *B60T 8/321* (2013.01); *B60G 17/0523* (2013.01); *B60T 2270/82* (2013.01)
USPC ........................................... 303/20

(58) Field of Classification Search
USPC ................... 303/5, 20, DIG. 9, DIG. 10, 199
See application file for complete search history.

(56) References Cited

U.S. PATENT DOCUMENTS

| 4,584,487 | A |   | 4/1986 | Hesse et al. |
| 5,255,962 | A |   | 10/1993 | Neuhaus et al. |
| 5,752,748 | A | * | 5/1998 | Schramm et al. ............... 303/20 |

(Continued)

FOREIGN PATENT DOCUMENTS

| DE | 33 35 932 A1 |   | 4/1985 |
| DE | 4014561 A1 | * | 11/1991 |

(Continued)

*Primary Examiner* — Anna Momper
(74) *Attorney, Agent, or Firm* — Kramer Levin Naftalis & Frankel LLP

(57) ABSTRACT

A modulator for a vehicle brake system connected to a central module via a data bus, includes at least one input for capturing measured values and at least one output for controlling at least one electromagnetic valve. A control circuit for actuating the valve is connected by the bus such that the measured values are transmitted to the central module. Control commands for actuating the valve are calculated from the measured values in the central module, and are transmitted via the data bus to the modulator so that the it selects the valve as a function of the commands. A vehicle system has at least two modulators and a central module integrated in a modulator. The modulator can be used as a pressure modulator in an air suspension system or in an electronic braking system or in a conventional braking system with an anti-lock braking system or an electronic stability program.

20 Claims, 4 Drawing Sheets

(56) References Cited

U.S. PATENT DOCUMENTS

| | | |
|---|---|---|
| 6,206,488 B1 | 3/2001 | Binder et al. |
| 6,216,080 B1 | 4/2001 | Riedemann et al. |
| 6,264,289 B1 | 7/2001 | Franke et al. |
| 6,345,225 B1 * | 2/2002 | Bohm et al. ............. 701/70 |
| 6,449,551 B1 * | 9/2002 | Wrede ..................... 701/70 |
| 7,676,286 B2 * | 3/2010 | Disser et al. ............. 700/82 |
| 2001/0045771 A1 * | 11/2001 | Corio et al. ............. 303/20 |
| 2002/0079736 A1 * | 6/2002 | Soga ..................... 303/113.1 |
| 2005/0088040 A1 * | 4/2005 | Otsuka et al. ........... 303/116.4 |
| 2007/0152500 A1 * | 7/2007 | Wakabayashi et al. ... 303/155 |

FOREIGN PATENT DOCUMENTS

| | | |
|---|---|---|
| DE | 42 27 084 A1 | 2/1994 |
| DE | 43 39 570 A1 | 5/1995 |
| DE | 196 40 148 A1 | 4/1998 |
| DE | 197 33 379 A1 | 2/1999 |
| DE | 198 32 167 A1 | 5/1999 |
| DE | 197 55 431 A1 | 6/1999 |
| DE | 198 54 788 A1 | 5/2000 |
| DE | 102 11 280 A1 | 9/2003 |
| DE | 10 2005 024 818 A1 | 11/2006 |
| EP | 0 467 112 A2 | 1/1992 |

* cited by examiner

MODULATOR

FIELD OF THE INVENTION

The present invention generally relates to a modulator, in particular a pressure modulator in a vehicle brake system, where the modulator is connected to a central module via a data bus.

BACKGROUND OF THE INVENTION

DE 198 54 788 A1 describes a wheel module for a vehicle. The wheel module is used to control the braking force in an electronic brake system (EBS). The wheel module receives, as input signals, wheel speed signals and further signals that are acquired directly at the vehicle wheel. The wheel speed signals and the further signals are processed directly in the wheel module. In addition, the wheel module is connected to a central module via a data bus.

A disadvantage of the foregoing is that a wheel module of complex design must be used in order for the signal processing of the wheel speed signals and of the further signals to take place directly in the wheel module. Such a wheel module therefore must have a high level of "intelligence" in the form of, for example, microprocessor circuits. Such a complex design makes the known wheel module very expensive to manufacture. Furthermore, the wheel module is connected to a central module, but only more subordinate calculations are carried out in the central module and transmitted to the wheel module by means of a data bus. Nevertheless, the central module must also have a sufficient level of "intelligence" in order to carry out the subordinate calculations. A brake system that has a known wheel module and a known central module therefore comprises a plurality of components each with its own "intelligence", which makes the brake system per se and also the maintenance of the brake system overall very complex and therefore expensive. Furthermore, the necessity to keep available a large number of different assemblies for the spare parts business (replacement parts, repair etc.) is a disadvantage. A further disadvantage is that changes to individual assemblies are very time-consuming and costly since compatibility with a large number of other components must be ensured. Further still, it is a disadvantage that only unsatisfactory re-use of the existing components can take place. Likewise, it is a disadvantage that the cost of these assemblies is very high owing to the complex assemblies that are fabricated in low numbers.

SUMMARY OF THE INVENTION

It is therefore an object of the present invention to provide a modulator that can be used many times in one application on a universal basis without preparation, and that is controlled from a central module via a high-speed data bus system.

Generally, the modulator according to embodiments of the present invention can be used wherever measured values have to be collected in a decentralized fashion and a pressure has to be controlled and/or solenoid valves actuated and/or motors adjusted.

An advantage of the modulator according to embodiments of the present invention is that the complexity of a system in which the modulator is used, for example in a vehicle brake system, is reduced. The simple design makes maintenance and servicing of the modulator much easier.

The modulator according to embodiments of the present invention can advantageously be used as a pressure modulator in an electronic brake system (EBS) or in a conventional brake system with an anti-lock brake system (ABS) or with an electronic stability program (ESC) or in a pneumatic suspension system or the like.

A further advantage of the modulator according to embodiments of the present invention is that the necessary computing operations are carried out only in a central module, as a result of which the "intelligence" is centralized in one system, for example in a brake system. Such centralization makes maintenance of the system easier, since, for example, the requisite system software only resides in the central module and not in one or more modulators. The modulator is therefore not determined until it is installed.

In addition, by virtue of the simple design of the modulator according to embodiments of the present invention, advantageously only one component need be kept available. As a result, the component is produced in greater numbers and therefore its cost drops. In addition, possible modifications to the modulator have virtually no connection with the central module.

The modulator according to embodiments of the present invention is advantageously reduced to the resources necessary for a pressure modulator, for example processor, output stages, inputs for two wheel speed sensors, input for a pressure sensor. Use of an integration-capable, adapted computer core permits the entire circuitry to be integrated into an ASIC. This ASIC is advantageously embodied using a high-voltage process, which removes the need for a separate voltage supply.

A further advantage of the inventive modulator is that a control circuit is not closed until the modulator is connected to the central module.

In one embodiment, the modulator receives signals in the form of an ON/OFF signal from the central module, as a result of which, for example, valves that are connected to the modulator are opened or closed.

In another embodiment, the central module can also be integrated in a modulator.

In a further embodiment of the inventive modulator in a vehicle brake system, the ASIC is combined with the valves for pressure modulation. The result is a 1 k pressure modulator (a pressure control circuit for an axle). If a 2 k pressure modulator (two pressure control circuits) is required on one axle, two ASICs are placed in a corresponding valve block.

Furthermore, it is advantageous to use a high-speed data bus system, for example FLEXRAY. The transmission rate of the data bus system used is advantageously ≥1 Mbit/s, and the repetition rate of the pressure messages are preferably ≤5 ms.

Still other objects and advantages of the present invention will in part be obvious and will in part be apparent from the specification.

The present invention accordingly comprises the features of construction, combination of elements and arrangement of parts, all as exemplified in the constructions herein set forth, and the scope of the invention will be indicated in the claims.

BRIEF DESCRIPTION OF THE DRAWINGS

For a fuller understanding of the present invention, reference is had to the following exemplary embodiments, which are explained in greater detail with reference to the accompanying drawings, in which.

REFERENCE SYMBOLS

Figure 1:
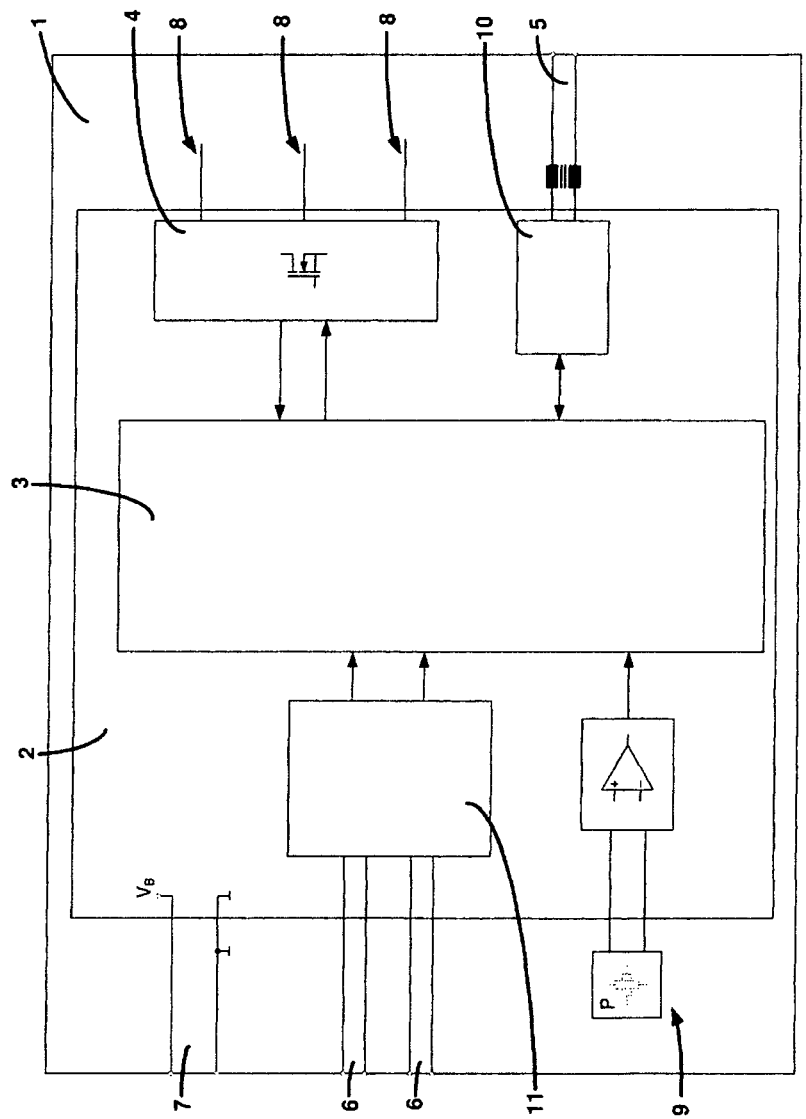
FIG. 1 shows the basic design of a modulator according to an embodiment of the present invention.

1 Modulator
2 ASIC
3 Main processor
4 Output stage
5 Inputs and outputs for a data bus/bus interface
6 Inputs for wheel speed sensors
7 Further input
8 Outputs
9 Additional inputs
10 Bus driver
11 Signal conditioning means
12 1-channel modulator
13 2-channel modulator
14 Trailer control modulator
15 EBS/ABS-ECU (central module)
16 ESC sensor module
17 Steering angle sensor
18 CAN converter module
19 Vehicle data bus (CAN)
20 Brake (CAN)
21 ABS solenoid control valve
22 Wheel speed sensor
23 Electrical outputs/loads
24 Electrical inputs/loads
25 Warning lamp
26 Brake value signal transmitter
27 Brake cylinder
28 Pneumatic control line
29 Air vessel
30 Pneumatic supply line
31 Electrical control line
32 Electrical sensor line
33 Bellows pressure control valve
34 Air spring bellows
35 Ride level sensor
36 Coupling head brake
37 Coupling head supply
38 Trailer control valve
39 Foot brake valve
40 Further sensor line

DETAILED DESCRIPTION OF THE PREFERRED EMBODIMENTS

Referring now to the drawing figures, FIG. 1 is a block diagram showing the basic design of the modulator according to one embodiment of the present invention. In this embodiment, the modulator (1) comprises an ASIC (2) with a main processor (3) with an integrated or separate memory, for example an EEPROM and/or a ROM and/or a RAM. Output stages (4) for activating solenoid valves that are connected to the outputs (8) are likewise implemented on the ASIC (2) and/or the modulator (1), wherein at least one output stage (4) can be current-controlled. The valves that can be activated by the output stages (4) are mounted, for example, in a valve block. In addition, the ASIC (2) has at least one input/output (5) for a data bus, for example in the form of a bus interface. What is referred to as a bus driver (10) can be connected downstream of input/output (5). Furthermore, at least one input (6) for a wheel speed sensor is provided. The ASIC (2) has at least one signal conditioner (11) that can condition the signals of inductive and/or active wheel speed sensors for the main processor (3). The ASIC (2) can also have additional inputs (9) for non-compensated pressure sensor elements or fully compensated pressure sensors (not illustrated here). The ASIC (2) is supplied with operating voltage via a further input (7). Further elements of the ASIC (2) such as, for example, a voltage conditioner, a measuring device for measuring the load current, one or more analog/digital converters and bus controls and bus guardians are not shown.

The ASIC (2) receives control commands from a central module via the input/output of the data bus. In the simplest case according to a first embodiment, these control commands can be transmitted as ON/OFF signals. As a function of these control commands, the ASIC (2) then actuates, via the output stages (4), solenoid valves and/or actuating motors at the outputs, which are subsequently opened or closed or adjusted. In the case of a vehicle brake system, this may involve valves in a brake circuit, for example ABS valves.

The modulator (1) can be used in an extremely variable way by virtue of the fact that the inputs and outputs of the modulator (1) can be configured freely and the function can be reduced to the reading in of what are referred to as raw data and the actuation of output stages. If one or more of the output stages (4) (see FIG. 1) of the modulator (1) is/are configured with optional current control, for example servomotors can also be actuated directly instead of the modulators.

If the modulator is used in a vehicle brake system having two vehicle axles, there is usually a modulator at each vehicle wheel or only at each vehicle axle, respectively. These modulators are connected via the data bus to a central module, for example in the case of a vehicle brake system the brake control unit (EBS or ABS-ECU). However, according to a second embodiment, it is also possible to integrate the central module in one of the modulators that are used, as a result of which the number of components to be installed can be reduced. In the case of a vehicle with four wheels, for example, a modulator can therefore be located either at each vehicle wheel—with the four modulators being connected to a central module—or the central module is integrated in one of the four modulators. In addition, a plurality of modulators can also be combined with a central module and integrated, for example, in the electronic control unit (ECU) of a brake system.

If the modulator is used in a brake system, according to a third embodiment the ASIC can be combined with valves to form a pressure modulator. The result is a 1-channel modulator (a pressure control circuit for one axle). If a 2-channel modulator (two pressure control circuits) is required on one axle, two ASICs are placed in a corresponding valve block.

Figure 2:
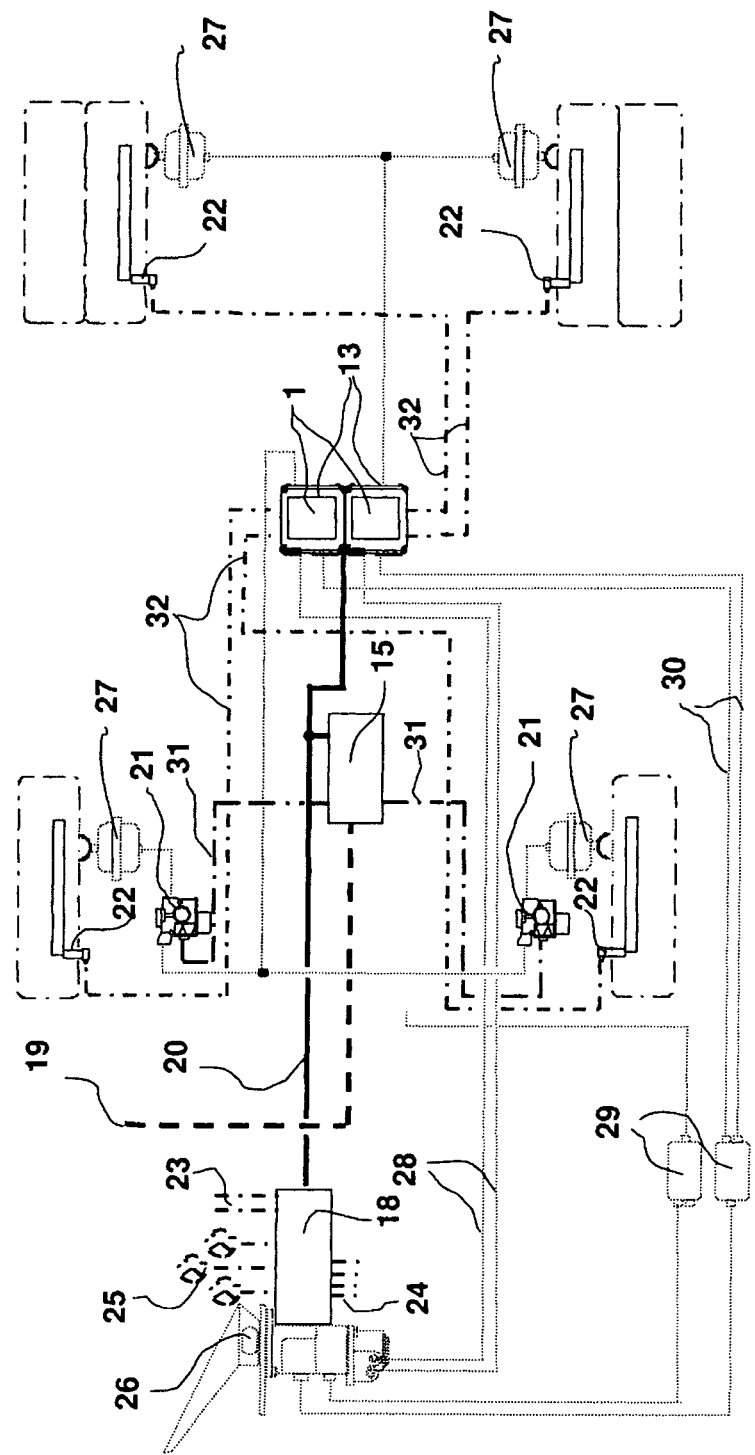
FIG. 2 shows a modulator according to an embodiment of the present invention employed in an EBS 4S3M system.

FIG. 2 shows the use of a modulator in a vehicle with what is referred to as an EBS 4S3M system (4 sensed wheels with 3 modulated outputs in an electronic brake system). The vehicle data are transferred here directly in a known manner from a vehicle data bus (19) to the EBS-ECU (15). In this embodiment, the EBS-ECU (15) therefore constitutes the central module. Additional information is read in via a CAN converter module (18), which is represented as part of the brake value signal transmitter (26). Alternatively, however, the CAN converter module (18) can be arranged separately or integrated into the EBS-ECU (15), specifically if the EBS-ECU (15) is arranged in the vehicle cab. Likewise, the EBS-ECU (15) can be arranged separately within or outside the cab or integrated into components such as, for example, a brake value signal transmitter (26) or a 2-channel modulator (13). The information relating to the status of the inputs (24) and to the braking request of the vehicle driver from the status of the signals of the brake value signal transmitter (26) is transferred from the CAN converter module (18) to the EBS-ECU (15) on a brake CAN (20).

In the modulator (1) (see FIG. 1), the ASIC (2) (see FIG. 1) conditions the signals generated by the wheel speed sensors (22) and transmitted via an electrical sensor line (32) such that the raw data for the determination of vehicle speed can be transmitted to the EBS-ECU (15) on the brake CAN (20) via the bus interface (5) (see FIG. 1). The signals that are present at the pressure sensor input (9) (see FIG. 1) and at further possible analogous inputs are conditioned and transmitted in an analogous fashion.

In the embodiment illustrated in FIG. 2, in each case one axle of the vehicle is sensed and controlled via one side of a 2-channel modulator (13) with two integrated modulators (1). However, it is also conceivable to sense and control in each case one axle via a 1-channel modulator (12) (see FIG. 3) with one integrated modulator (1). Control signals are generated in the EBS-ECU (15) from the values that are transferred to the EBS-ECU (15) from the CAN converter module (18) and the modulators (1) via the brake CAN (20), and corresponding control commands are then transferred to the modulators (1) via the brake CAN (20). The control circuit of the wheels connected to the 2-channel modulator (13) is therefore closed via the EBS-ECU (15). The solenoid valves in the 2-channel modulator (13) are then actuated on the basis of the control signals transferred via the brake CAN (20), current-controlled by the respective output stages (4) (see FIG. 1) of the modulators (1) or alternatively with a high level or low level. The ABS solenoid control valves (21) are actuated directly by the EBS-ECU (15) via electrical control lines (31).

Dispensing with the solenoid control valves (21) and the control lines (31) results in the EBS minimum configuration 4S2M (4 sensed wheels, 2 modulated outputs). The intelligence of the modulators (1) is reduced here to the basic functions of the hardware fault detection, the transfer of the raw data formed from the sensor input signals to the EBS-ECU (15), the actuation of the output stages (4) (see FIG. 1) according to the control parameters transferred by the EBS-ECU (15), and to the configuration of the equipment.

The further components according to FIG. 2 relate to particular features in a pneumatic utility vehicle brake system. The pneumatic utility vehicle brake system has air vessels (29) for storing compressed air, the air vessels (29) being connected to brake cylinders (27) by means of pneumatic supply lines (30) via the 2-channel modulator (13). In addition, the brake value signal transmitter (26) is also connected to the brake cylinders (27) by pneumatic control lines (28) via the 2-channel modulator (13). Furthermore, the CAN converter module (18) can also have further electrical outputs (23) and warning lamps (25).

Figure 3:
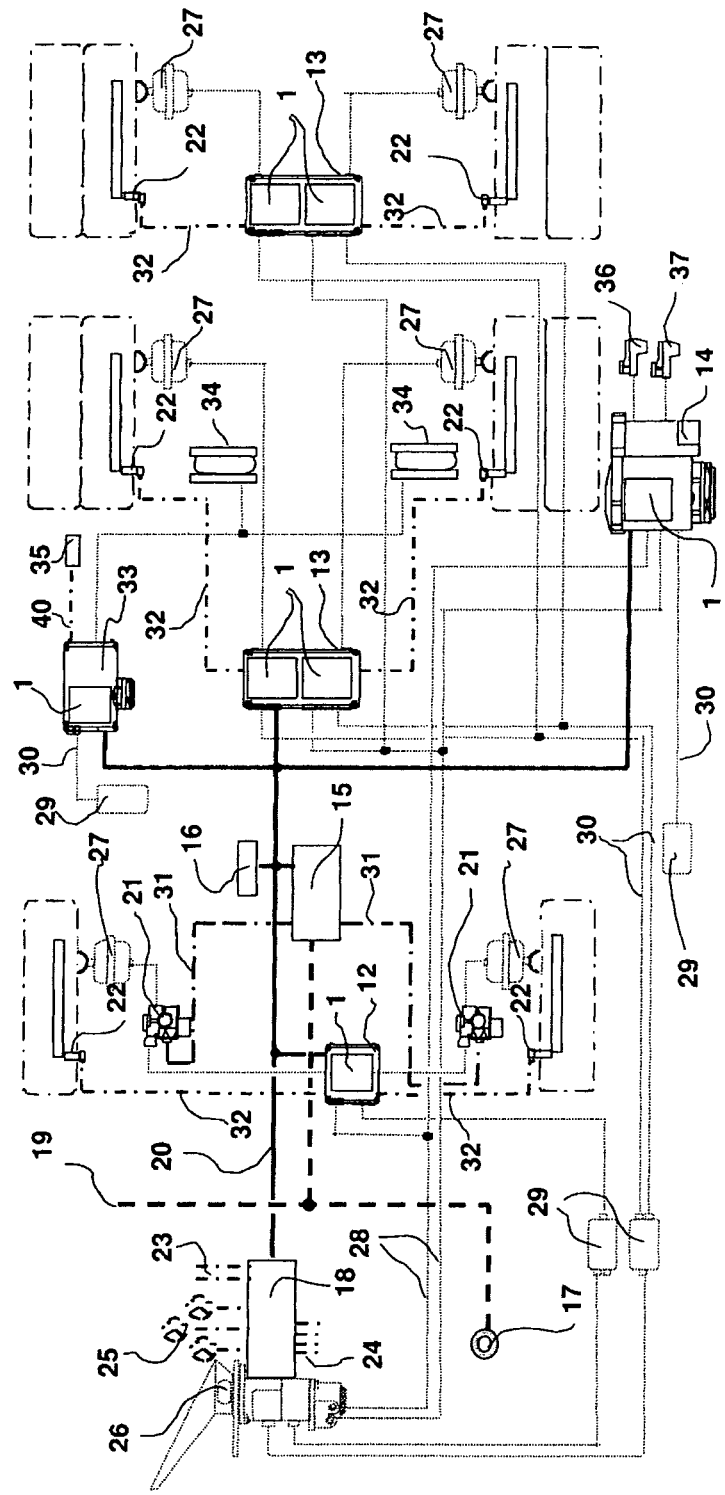
FIG. 3 shows a modulator according to an embodiment of the present invention employed in an EBS 6S6M system.

FIG. 3 shows the use of the modulator in what is referred to as an EBS 6S6M system of an electronically controlled vehicle brake system in a possible design configuration for a three-axle vehicle. A 6S6M system (6 sensed wheels, 6 modulated outputs) with an electronic stability program (ESC), a trailer actuator and an integrated pneumatic suspension control is illustrated here. In an extension of the block circuit diagram according to FIG. 2, the sensing and control of the rear axle and of the additional axle are carried out here in each case by means of two modulators (1) that are integrated in a 2-channel modulator (13). In addition, a 1-channel modulator (12) with an integrated modulator (1) for sensing and controlling is used at the front axle. The possible configurations 2S2M and 4S2M, respectively, are then obtained for the 2-channel modulator (13) by virtue of the configuration of the modulator (1) with two inputs for sensing the wheel speed for the 1-channel modulator (12) with the configuration 2S1M (2 sensed wheels, 1 modulated output). Any desired configurations of axle controls and wheel controls can therefore be implemented.

Furthermore, possibilities of use of the modulators (1) that differ from the axle control or wheel control are illustrated in FIG. 3. For example, the trailer actuation, illustrated by means of a coupling head supply (37) and a coupling head brake (36), is carried out according to FIG. 3 by a trailer control modulator (14) with an integrated modulator (1), with only raw data being acquired by the modulator (1), in a way that is analogous to the wheel control or axle control, and being transferred to the EBS-ECU (15) via the brake CAN (20). The evaluation of the raw data and the calculation of the control times for the actual brake pressure control are carried out in a way that is analogous to the wheel control in the EBS-ECU (15). The modulator (I) then actuates the output stages (4) in accordance with the transferred control commands (see FIG. 1).

The ride level control of the pneumatic suspension system is also implemented in a similar way. A signal of a ride level sensor (35) is read out by means of a further sensor line (40) via a bellows pressure control valve (33) with integrated modulator (1) and is transferred to the EBS-ECU (15). Air spring bellows (34) for lifting or lowering the additional axle are then supplied with compressed air via this bellows pressure valve (33). If appropriate, further sensors such as, for example, bellows pressure, can be read in via an A/D converter, and the raw data can be transferred. The evaluation of the raw data and the calculation of the control times for the actual bellows pressure control are carried out in a way that is analogous to the wheel control in the EBS-ECU (15).

In addition, an ESC sensor module (16), which senses driving states of the vehicle, in particular for an electronic stability control system, can also be connected to the brake CAN (20). Furthermore, signals of a steering angle sensor (17), which is connected to the vehicle data bus system (19), can also be evaluated.

Figure 4:
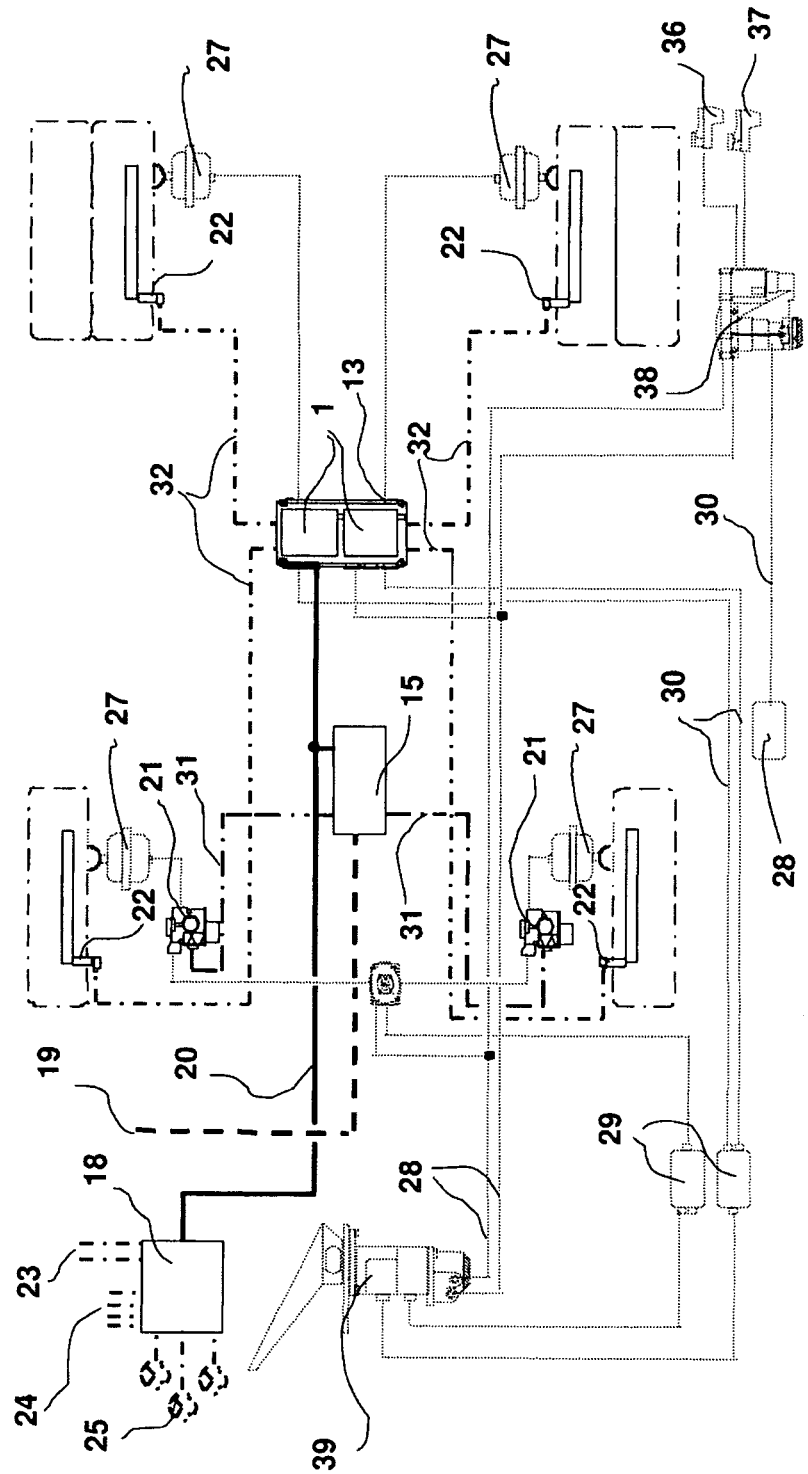
FIG. 4 shows a modulator according to an embodiment of the present invention employed in an ABS 4S4M system.

FIG. 4 shows the use of the modulator in what is referred to as an ABS 4S4M system of a conventional anti-lock brake system of a vehicle, and a foot brake valve (39) is used instead of a brake value signal transmitter (26) (see FIGS. 1 and 2). Here, the reading in of the axle-related and/or wheel-related data for a 4S4M system (4 sensed wheels, 4 modulated outputs) is effected via a 2-channel modulator (13) with integrated modulator (1). The transfer of the raw data to the ABS-ECU (15) and the actual control are carried out essentially as already described in FIG. 2. If the ABS-ECU (15) is arranged in the vehicle cab, it is optionally possible to integrate the CAN converter module (18) into the ABS-ECU (15), or if it is arranged outside the cab it is possible to integrate the ABS-ECU (15) in the 2-channel modulator (13).

The changed functionality of the 2-channel modulator (13) in terms of actuation of the valve magnets for performing pressure control only in the case of an ABS system or a traction control system or even during the ESC control process in the case of an expanded system, is controlled exclusively by means of the ABS-ECU (15) here.

Alternatively, it is also possible to integrate a modulator (1) into an ABS solenoid control valve (21) for the front axle. The actuation of the valve magnets is then effected in a way that is analogous to the 2-channel modulator (13) on the basis of the control commands of the ABS-ECU (15) that are transferred via the brake CAN (20). As a result, for example a 6S4M system (6 sensed wheels, 4 modulated outputs with select low control of the two rear axles according to the side) can then be formed in conjunction with the 2-channel modulator (13).

Alternatively, it is also possible to use a 1-channel modulator (12) with one integrated modulator (1) for reading in the raw data and actuating the valve magnets for performing pressure control during the ESC or RSC (Roll Stability Control) at the front axle. The ABS solenoid control valves (22) are then controlled directly by the ABS-ECU (15), as illustrated in FIG. 4.

In addition, the illustrated vehicle system can also have a pneumatic trailer control valve (38), in which case a vehicle trailer (not illustrated) can be supplied with compressed air for the brake activation via the trailer control valve (38), illustrated by means of the coupling head brake (36), and with compressed air for further compressed air consumers in the trailer, illustrated by means of the coupling head supply (37).

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A modulator for a pneumatic brake system of a vehicle, the modulator being connectable to a central module via a data bus and configured to reside in a valve block of the pneumatic brake system to combine with at least one solenoid valve in the valve block when the modulator is operatively disposed in the valve block, the modulator comprising at least one input for acquiring measured values and at least one output for actuating the at least one solenoid valve in the valve block, the modulator being configured to be a part of a control circuit and to first close the control circuit when the modulator is connected to the central module via the data bus to effect transmission of the measured values to the central module, and to receive control commands from the central module in the form of ON/OFF signals generated in the central module based on the measured values and operative to cause the modulator to actuate and deactuate the at least one solenoid valve via the at least one output.

2. The modulator as claimed in claim 1, further comprising an application-specific integrated circuit ("ASIC"), a voltage supply input and at least one input/output for said data bus.

3. The modulator as claimed in claim 2, wherein said ASIC includes a main processor and output stages for actuating said at least one solenoid valve.

4. The modulator as claimed in claim 2, wherein said ASIC includes a main processor operable to actuate output stages arranged outside said ASIC.

5. The modulator as claimed in claim 1, wherein said control commands are ON/OFF signals.

6. The modulator as claimed in claim 1, wherein said data bus has a transmission rate ≥1 Mbit/s.

7. The modulator as claimed in claim 6, wherein said data bus transmits said control commands with a repetition rate ≤5 ms.

8. The modulator as claimed in claim 1, wherein said data bus employs an automotive network communications protocol.

9. A vehicle system, comprising at least two modulators as claimed in claim 1, said central module being integrated into one of said modulators.

10. A vehicle pneumatic suspension system, comprising a modulator as claimed in claim 1.

11. An actuator for actuating electric motors having at least one of travel sensors and force sensors, said actuator comprising a modulator as claimed in claim 1.

12. An electronic brake system, comprising a modulator as claimed in claim 1.

13. A vehicle brake system, comprising a modulator as claimed in claim 1.

14. The vehicle brake system as claimed in claim 13, comprising at least one of an anti-lock brake system and an electronic stability pro gram.

15. The modulator as claimed in claim 1, said modulator being integrated with a second substantially identical modulator, said second modulator being configured to reside in said valve block to combine with said modulator and said at least one solenoid valve in said valve block.

16. The modulator as claimed in claim 15, said modulator being integrated with said second modulator to form a single 2-channel modulator.

17. The modulator as claimed in claim 15, said at least one solenoid valve comprising at least two solenoid valves, each of said modulator and said second modulator being associated with a respective one of said at least two solenoid valves in said valve block.

18. The modulator as claimed in claim 1, said central module being integrated in said modulator and configured to communicate with at least one other modulator of said pneumatic brake system.

19. The modulator as claimed in claim 1, wherein said pneumatic brake system comprises at least one air vessel for storing compressed air, said modulator being further configured to couple said at least one air vessel to at least one brake cylinder of said vehicle.

20. The modulator as claimed in claim 1, wherein the modulator is integrated into the at least one solenoid valve.

\* \* \* \* \*